(12) United States Patent
Sumitomo et al.

(10) Patent No.: US 12,095,322 B2
(45) Date of Patent: Sep. 17, 2024

(54) STATOR

(71) Applicant: DAIKIN INDUSTRIES, LTD., Osaka (JP)

(72) Inventors: Hisato Sumitomo, Osaka (JP); Tatsuya Tonari, Osaka (JP); Yuji Nakazawa, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 395 days.

(21) Appl. No.: 17/481,071

(22) Filed: Sep. 21, 2021

(65) Prior Publication Data

US 2022/0006344 A1   Jan. 6, 2022

Related U.S. Application Data

(63) Continuation of application No. PCT/JP2020/012081, filed on Mar. 18, 2020.

(30) Foreign Application Priority Data

Mar. 27, 2019   (JP) .................................. 2019-061375

(51) Int. Cl.
  *H02K 3/14*   (2006.01)
  *H02K 1/16*   (2006.01)
  (Continued)

(52) U.S. Cl.
  CPC ............... *H02K 3/14* (2013.01); *H02K 1/165* (2013.01); *H02K 3/28* (2013.01); *H02K 3/30* (2013.01); *H02K 3/38* (2013.01); *H02K 3/493* (2013.01)

(58) Field of Classification Search
  CPC .......... H02K 3/345; H02K 1/165; H02K 3/30; H02K 3/28; H02K 3/14; H02K 1/16; H02K 3/38; H02K 3/12; H02K 3/493
  See application file for complete search history.

(56) References Cited

U.S. PATENT DOCUMENTS 10,027,197 B2   7/2018 Mizutani et al.
10,658,884 B2 *  5/2020 Honjo ....................... H02K 1/04
(Continued)

FOREIGN PATENT DOCUMENTS

EP   3 079 234 A1   10/2016
EP   3 193 428 A1    7/2017
(Continued)

OTHER PUBLICATIONS

International Preliminary Report of corresponding PCT Application No. PCT/JP2020/012081 dated Oct. 7, 2021.
(Continued)

*Primary Examiner* — Leda T Pham
(74) *Attorney, Agent, or Firm* — Global IP Counselors, LLP (57) ABSTRACT

A stator includes a cylindrical stator core provided with a plurality of slots, a segment conductor mounted to the stator core, and a resin insulator including a winding barrel portion and an insertion portion that are integrally molded. The segment conductor includes a plurality of leg portions inserted into the slots, and a crossover wire portion that couples two of the leg portions inserted into the slots that differ from each other. The winding barrel portion is disposed between the stator core and the crossover wire portion of the segment conductor. The insertion portion is disposed on an inner side from the segment conductor inside the slots of the stator core.

20 Claims, 9 Drawing Sheets

(51) Int. Cl.
*H02K 3/28* (2006.01)
*H02K 3/30* (2006.01)
*H02K 3/38* (2006.01)
*H02K 3/493* (2006.01)

(56) References Cited

U.S. PATENT DOCUMENTS

| | | | |
|---|---|---|---|
| 11,271,447 B2* | 3/2022 | Fukuda | H02K 3/04 |
| 2016/0043605 A1 | 2/2016 | Mizutani et al. | |
| 2017/0201133 A1* | 7/2017 | Hattori | H02K 1/16 |
| 2019/0296597 A1 | 9/2019 | An | |
| 2019/0393740 A1* | 12/2019 | Yokoi | H02K 1/185 |

FOREIGN PATENT DOCUMENTS

| | | |
|---|---|---|
| EP | 3 442 099 A1 | 2/2019 |
| JP | 2006-223058 A | 8/2006 |
| JP | 2012-100389 A | 5/2012 |
| JP | 2014-207785 A | 10/2014 |
| JP | 2016-39712 A | 3/2016 |
| JP | 2016-93055 A | 5/2016 |
| JP | 2017-99211 A | 6/2017 |
| WO | 2018/008880 A1 | 1/2018 |

OTHER PUBLICATIONS

International Search Report of corresponding PCT Application No. PCT/JP2020/012081 dated Jun. 16, 2020.
European Search Report of corresponding EP Application No. 20 77 7451,4 dated Oct. 13, 2022.

* cited by examiner

FIG.9 ic
STATOR

CROSS-REFERENCE TO RELATED APPLICATIONS

This is a continuation of International Application No. PCT/JP2020/012081 filed on Mar. 18, 2020, which claims priority to Japanese Patent Application No. 2019-061375, filed on Mar. 27, 2019. The entire disclosures of these applications are incorporated by reference herein.

BACKGROUND

Field of Invention

The present disclosure relates to a stator.

Background Information

A motor generally uses a stator that includes a cylindrical stator core including a plurality of slots provided in a circumferential direction, and an insulator disposed at an end surface of the stator core in an axial direction. For example, Japanese Unexamined Patent Application Publication No. 2012-100389 discloses a stator that includes a stator winding provided by a segment method, the stator winding being fixed by using a coil fixation member that is an insulator.

The stator winding of the segment method is constituted by a plurality of segment conductors. Each of the segment conductors is a substantially U-shaped flat wire including a pair of linearly extending leg portions and a crossover wire portion that couples the leg portions to each other. The pair of leg portions of the segment conductor are inserted into different slots of the stator core. End portions of the leg portions of different segment conductors projecting from a side opposite to the insertion side of the slots are joined to each other.

In the stator disclosed in Japanese Unexamined Patent Application Publication No. 2012-100389, a flange portion that projects toward the inside of a slot is provided at each of tip portions of mutually adjacent teeth that form the slot. The coil fixation member is set to cover a gap formed between, of the leg portions of the plurality of segment conductors disposed in the slots, a leg portion disposed on the innermost side in the radial direction of the stator core and a flange portion. The coil fixation member includes a slot insertion portion inserted into the gap and suppresses movement of the segment conductors inside the slots by the slot insertion portion.

SUMMARY

A first aspect of the present disclosure is a stator that includes a cylindrical stator core provided with a plurality of slots, a segment conductor mounted to the stator core, and a resin insulator including a winding barrel portion and an insertion portion that are integrally molded. The segment conductor includes a plurality of leg portions inserted into the slots, and a crossover wire portion that couples two of the leg portions inserted into the slots that differ from each other. The winding barrel portion is disposed between the stator core and the crossover wire portion of the segment conductor. The insertion portion is disposed on an inner side from the segment conductor inside the slots of the stator core.

DETAILED DESCRIPTION OF EMBODIMENT(S)

Embodiment 1

Embodiment 1 will be described.

Figure 1:
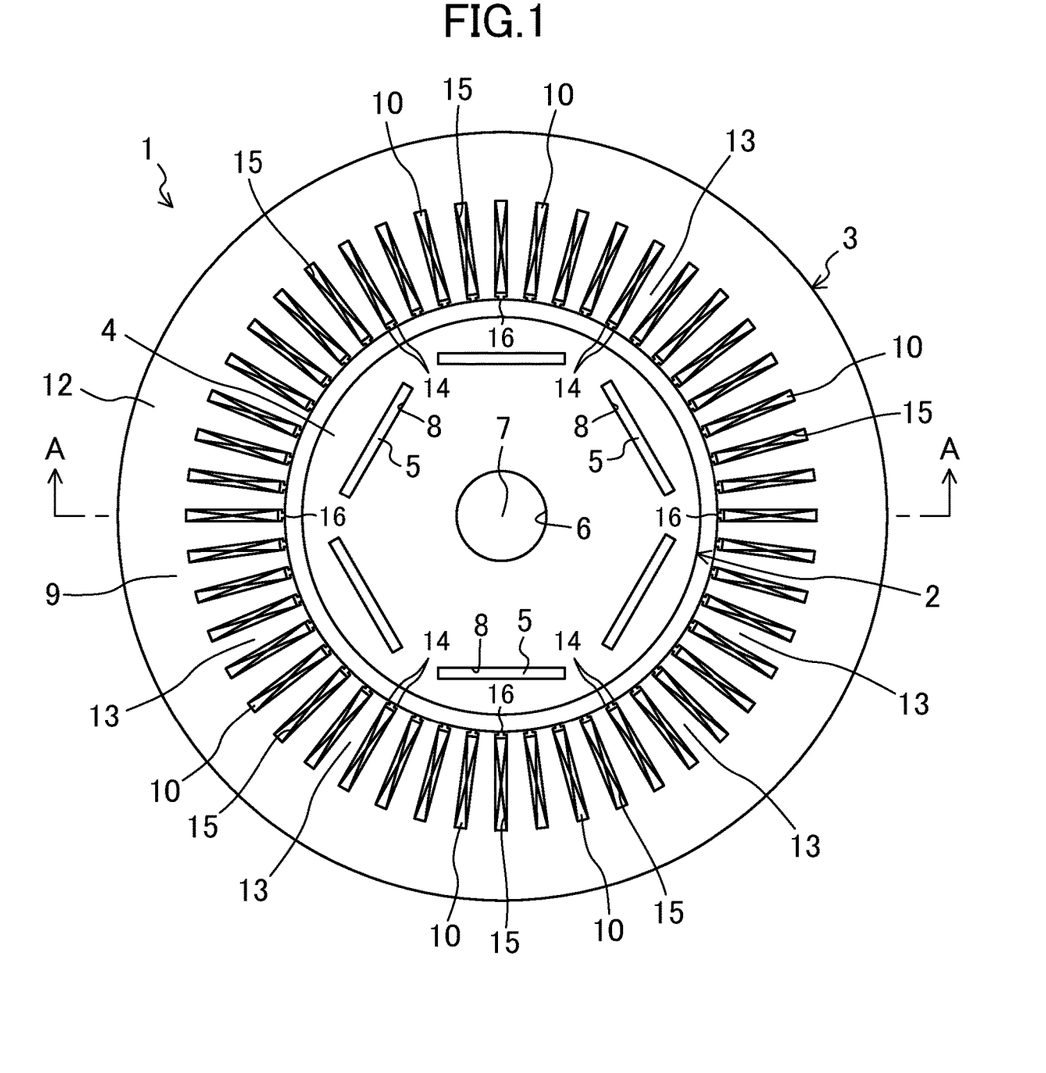
FIG. 1 is a cross-sectional view illustrating a configuration of a motor according to Embodiment 1.

A motor (1) is used in, for example, a compressor of an air conditioning apparatus, an automobile, and the like. The motor (1) is an embedded magnet synchronization-type motor (IPMSM: Interior Permanent Magnet Synchronous Motor). As illustrated in FIG. 1, the motor (1) includes a rotor (2) and a stator (3). The motor (1) is configured to be a motor of an inner rotary type (inner rotor type).

In the following description, an axial direction is a direction along the center line of the stator (stator core) and means a direction of the axis of a drive shaft. A circumferential direction means a direction around the axis of the drive shaft. A radial direction means a direction orthogonal to the axis of the drive shaft. An outer peripheral side means a side farther from the axis of the drive shaft. An inner peripheral side means a side closer to the axis of the drive shaft. A longitudinal section means a section along the axial direction. A cross-section means a section orthogonal to the axial direction.

Rotor

The rotor (2) includes a rotor core (4) and a plurality of permanent magnets (5).

The rotor core (4) has a substantially cylindrical shape. The rotor core (4) is a so-called laminated core. Specifically, the rotor core (4) is constituted by a large number of annular electromagnetic steel sheets punched by a press machine, the electromagnetic steel sheets being laminated in the axial direction. The rotor core (4) may be constituted by, for example, silicon steel sheets or a dust core.

A shaft hole (6) passes through the center of the rotor core (4) in the axial direction. A drive shaft (7) for transmitting a turning force is inserted into the shaft hole (6). The drive shaft (7) is fixed to the rotor core (4) by interference fitting (for example, shrink fitting). The axis (in other words, the axis of the rotor (2)) of the rotor core (4) and the axis of the drive shaft (7) are present on the same axis.

A plurality of magnet slots (8) pass through the outer peripheral side of the rotor core (4) in the axial direction. The plurality of magnet slots (8) are disposed with a predetermined interval therebetween in the circumferential direction of the rotor core (4). The magnet slots (8) are holes that accommodate the permanent magnets (5). The shapes of the magnet slots (8) are determined such that gaps are provided, as necessary, in a state in which the permanent magnets (5) are accommodated in the magnet slots (8).

The plate-shaped permanent magnets (5) are embedded in the magnet slots (8). In the example illustrated in FIG. 1, six permanent magnets (5) are provided, and the number of poles are six. As the permanent magnets (5), for example, sintered magnets or ferrite magnets, such as rare-earth magnets containing rare-earth elements, bond magnets constituted by magnets such as ferrite magnets or the like that are crushed and kneaded with rubber or a composite resin, or the like are used.

The rotor (2) is mounted to be rotatable with respect to the stator (3). The rotor (2) is rotated together with the drive shaft (7) by magnet torque that is generated by an attractive force and a repulsive force that are caused by the magnetic poles of the permanent magnets (5) and a rotating magnetic field generated in the stator (3) and, a reluctance torque that is generated by an attractive force with the salient pole of the rotor (2) due to the rotating magnetic field of the stator (3).

Stator

Figure 2:
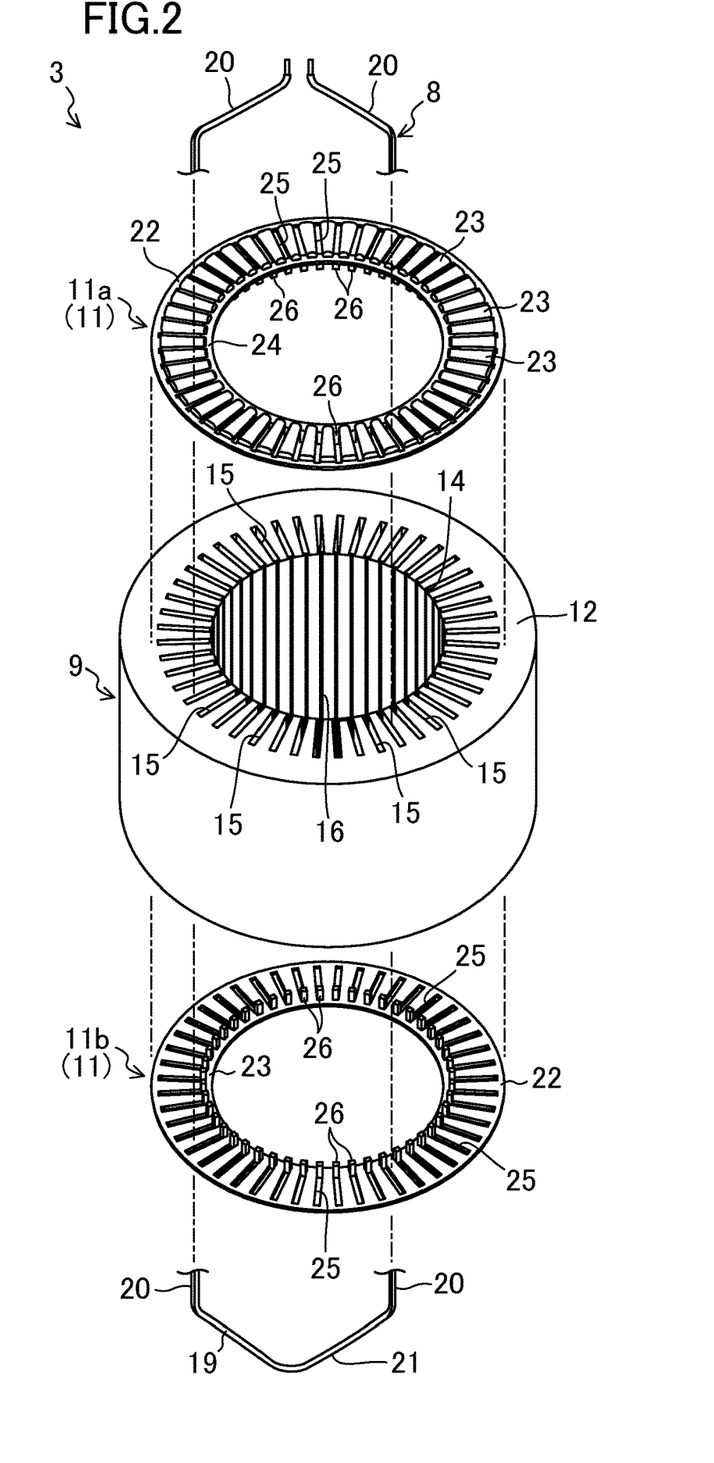
FIG. 2 is an exploded perspective view illustrating a configuration of a stator according to Embodiment 1.

As illustrated in FIG. 1 and FIG. 2, the stator (3) includes a stator core (9), a plurality of stator windings (10), and a pair of insulators (11a, 11b).

The stator core (9) has a substantially cylindrical shape. The stator core (9) is a so-called laminated core. Specifically, the stator core (9) is constituted by a large number of annular electromagnetic steel sheets punched by a press machine, the electromagnetic steel sheets being laminated in the axial direction. The stator core (9) may be constituted by, for example, a silicon steel sheet or a dust core. The stator core (9) has a shape like an internal gear.

The stator core (9) includes a back yoke (12) and a plurality of teeth (13). The back yoke (12) is a part of the stator core (9) on the outer peripheral side, and the part has an annular shape in plan view. The teeth (13) are parts that project from the back yoke (12) toward the inner side in the radial direction. These teeth (13) are disposed at a predetermined pitch in the circumferential direction of the stator core (9). In the example illustrated in FIG. 1, 48 teeth (13) are provided.

Figure 3:
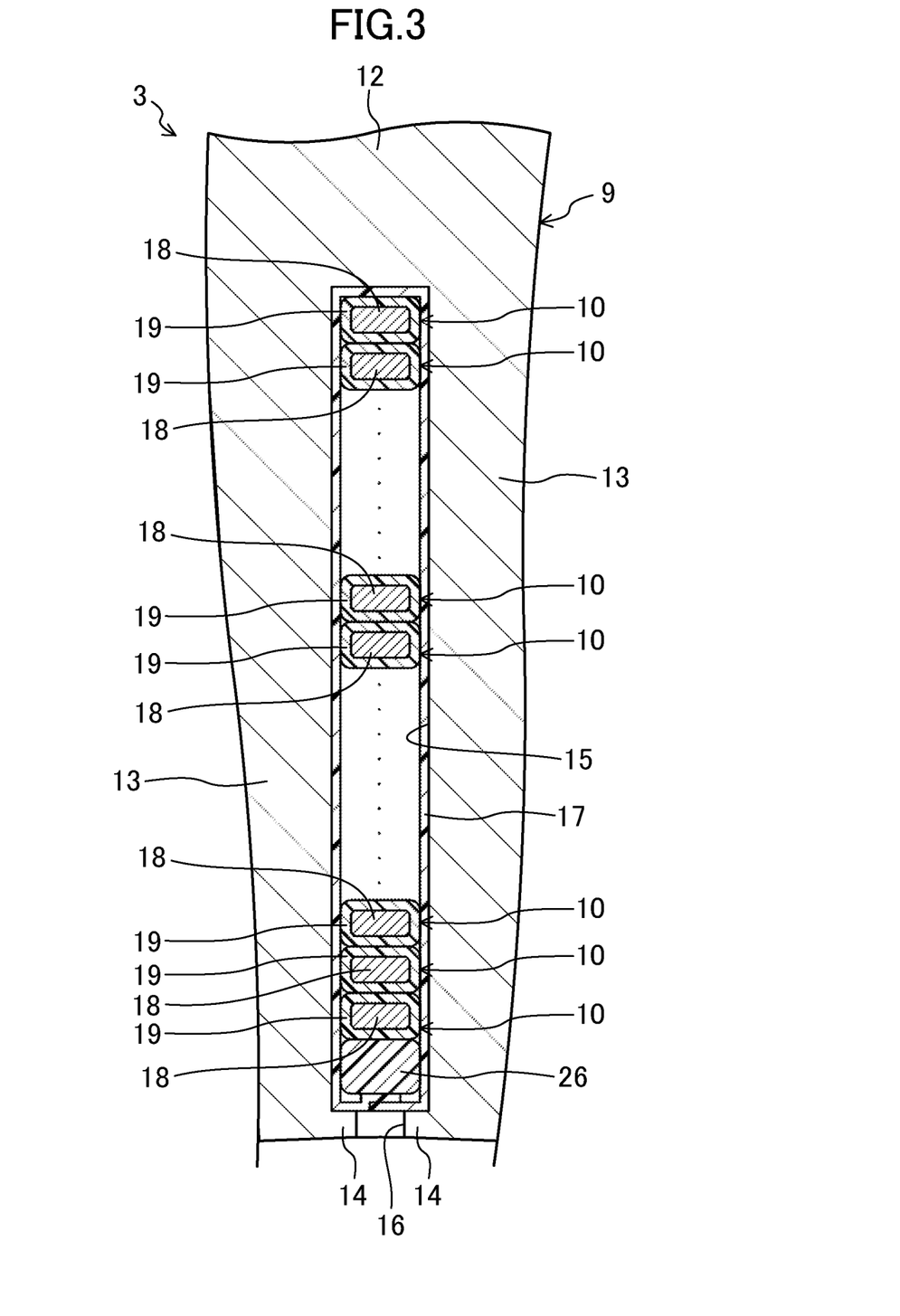
FIG. 3 is a cross-sectional view illustrating a main portion of the stator according to Embodiment 1.

As illustrated in FIG. 3, at end portions of the teeth (13) on the inner peripheral side, flange portions (14) that protrude on both sides in the circumferential direction of the stator core (9) are provided. The flange portions (14) are formed at the entirety of the teeth (13) in the axial direction. The inner-peripheral-side surfaces of the teeth (13) and the flange portions (14) constitute the inner peripheral surface of the stator core (9) and face the outer peripheral surface (cylindrical surface) of the rotor (2) to be spaced from the outer peripheral surface by a predetermined distance (air gap).

Figure 4:
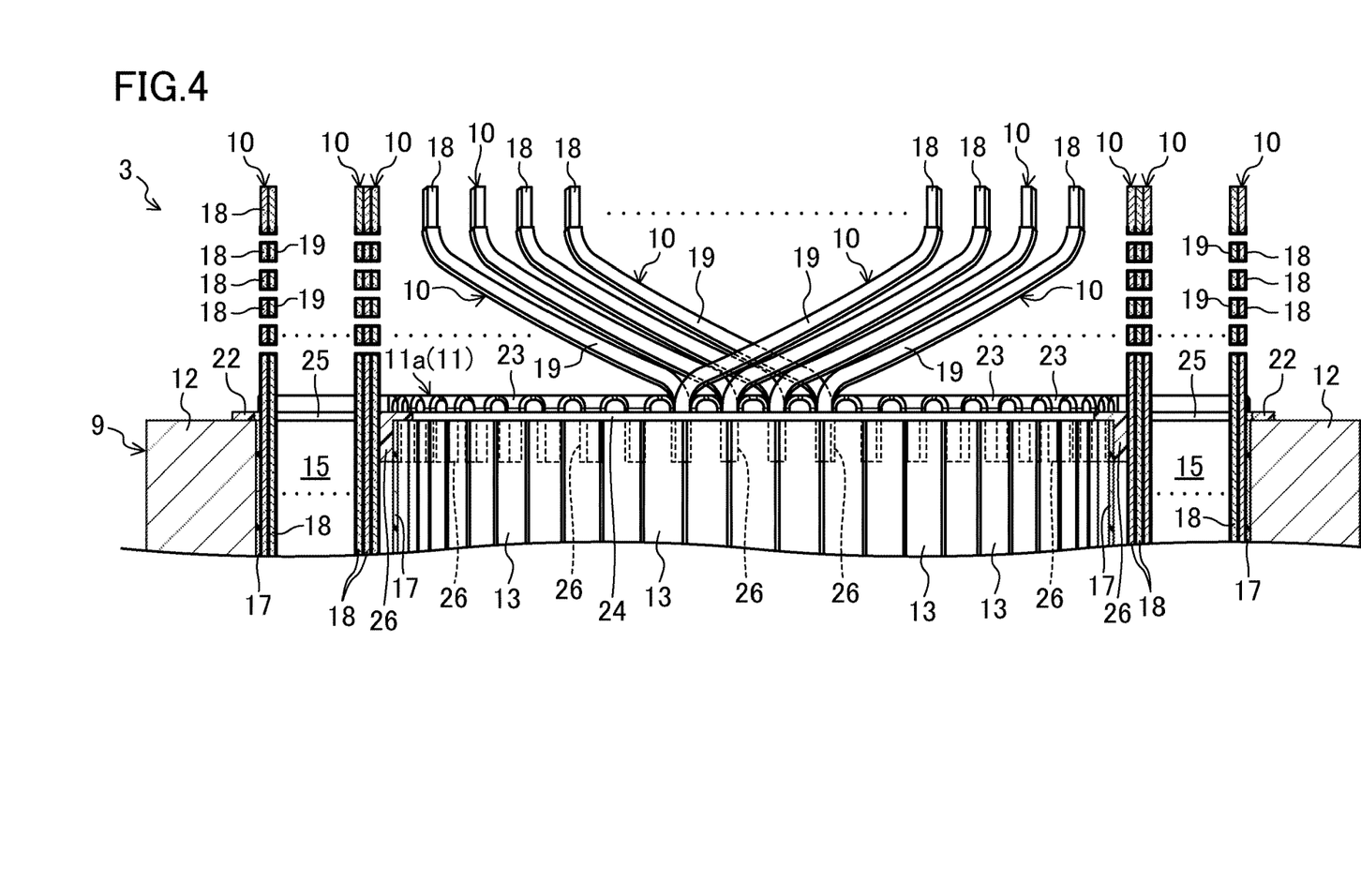
FIG. 4 is a longitudinal sectional view illustrating a configuration on one side in an axial direction of the stator at a portion corresponding to line A-A in FIG. 1.
Figure 5:
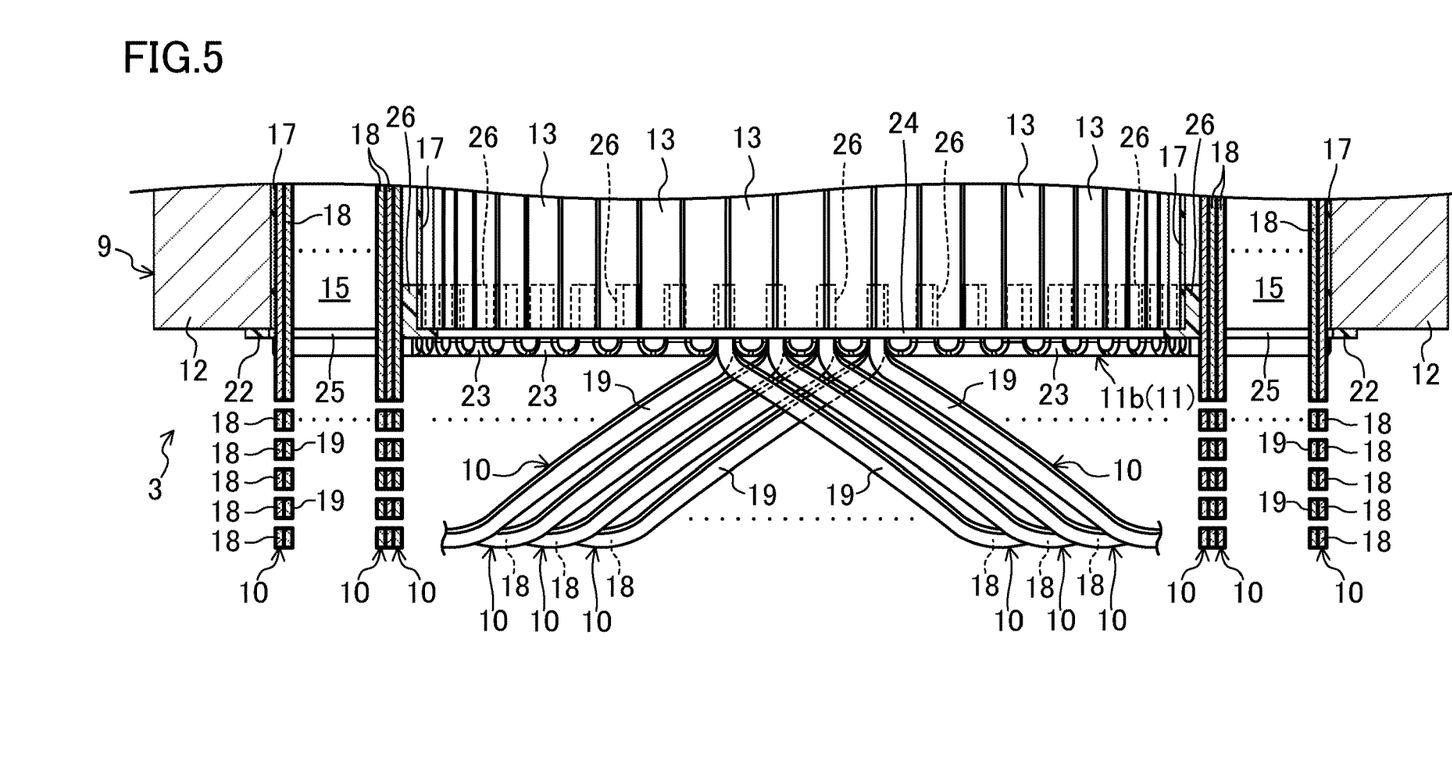
FIG. 5 is a longitudinal sectional view illustrating a configuration on the other side in the axial direction of the stator at a portion corresponding to line A-A in FIG. 1.

Winding slots (15) are provided between the teeth (13) that are adjacent to each other. The winding slots (15) are spaces in which the stator windings (10) are accommodated. In the example illustrated in FIG. 1, 48 winding slots (15) are provided. Each of the winding slots (15) has a so-called semi-closed structure and is open on the inner peripheral side between the flange portions (14) adjacent to each other. As also illustrated in FIG. 4 and FIG. 5, slit-shaped openings (16) are formed between the flange portions (14) adjacent to each other.

Each winding slot (15) is provided with a resin insulating sheet (17). In a state of being wound to be along the inner peripheral surface of the winding slot (15), the insulating sheet (17) is disposed between the inner peripheral surface of the winding slot (15) and the stator windings (10). The insulating sheet (17) is made of an insulating material such as polyethylene terephthalate (PET) or aramid fiber.

In the example illustrated in FIG. 3, both end portions of the insulating sheet (17) in a winding direction are superposed on each other on the inner peripheral side of the winding slot (15) and are positioned at a portion corresponding to the opening (16) between the flange portions (14) adjacent to each other. The insulating sheet (17) plays a role that electrically insulates the inner peripheral surface of the winding slot (15) of the stator core (9) and the stator windings (10).

The stator windings (10) are wound around the teeth (13) by distributed winding of a segment method. As the stator windings (10), a U-phase stator winding, a V-phase stator winding, and a W-phase stator winding are provided. The stator windings (10) of each phase are wound around the teeth (13) across a plurality of the winding slots (15) and are superposed on the stator windings (10) of the other phases by crossing the stator windings (10) of the other phases. At each of the teeth (13), electromagnets are constituted by these stator windings (10) of each phase.

The stator windings (10) of each phase are constituted by a plurality of segment conductors (18) with end portions of the different segment conductors (18) being joined to each other. The segment conductors (18) are flat wires that are each bent in a U-shape. As the flat wires, copper wires are used. This segment conductors (18) are each covered by a resin insulating film (19). The insulating film (19) is made of, for example, polyether ether ketone (PEEK) or the like.

The segment conductors (18) each include a pair of leg portions (20) that each include a linear part, and a crossover wire portion (21) that couples the pair of leg portions (20). The pair of leg portions (20) are inserted into the winding slots (15) that differ from each other. At each of the winding slots (15), a plurality of the leg portions (20) of the segment conductors (18) are disposed to form a line in the radial direction. The leg portions (20) of the segment conductors (18) constituting the stator windings (10) of different phases can be accommodated in the same winding slot (15).

Both end portions (tip parts of the leg portions (20)) of the segment conductors (18) are exposed from the insulating films (19) (refer to FIG. 4). End portions of the different segment conductors (18) projecting from a side opposite to the insertion side of the winding slots (15) are twisted together and joined by welding. The stator windings (10) of each phase are configured into predetermined patterns by such combinations of the plurality of segment conductors (18). These stator windings (10) of each phase are wound around the teeth (13) via the insulators (11a, 11b).

As the insulators (11a, 11b), a first insulator (11a) and a second insulator (11b) are included. The first insulator (11a) is disposed at an end surface of the stator core (9) on one side in the axial direction. The second insulator (11b) is disposed at an end surface of the stator core (9) on the other side in the axial direction. The stator core (9) is held from both sides in the axial direction by the first insulator (11a) and the second insulator (11b).

Insulators (11) used as the first insulator (11a) and the second insulator (11b) have the same configuration.

Figure 6:
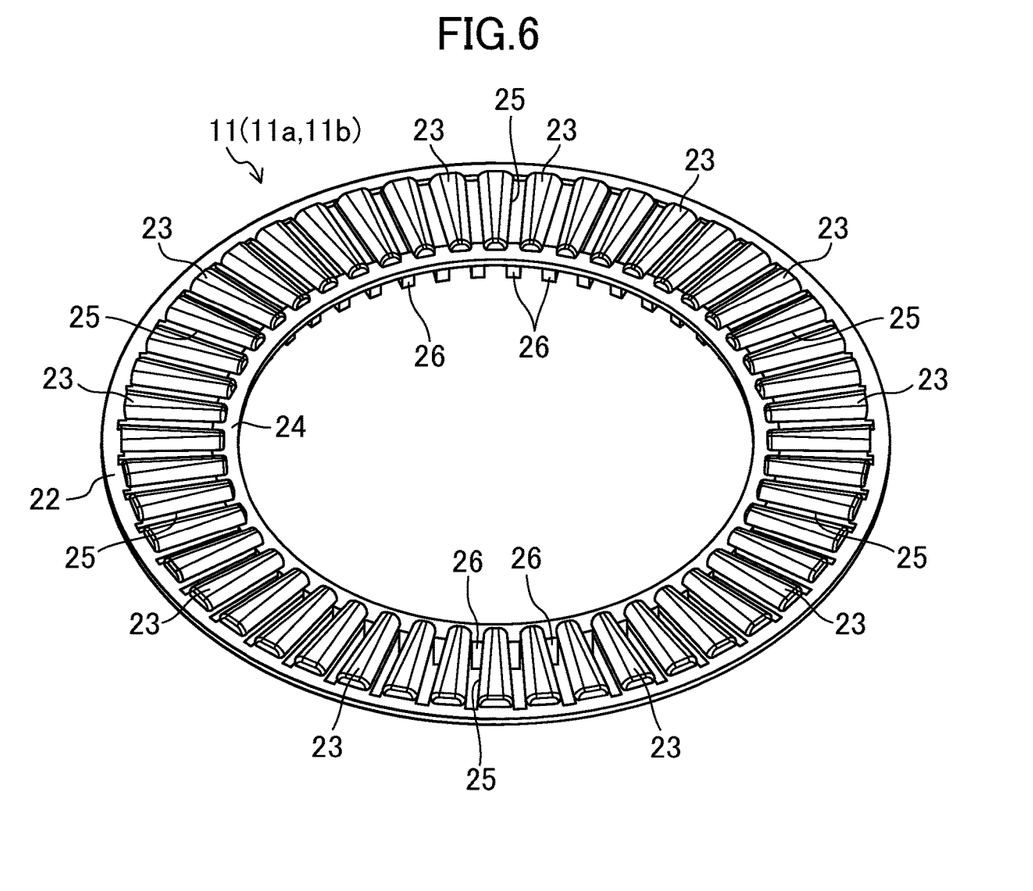
FIG. 6 is a perspective view of an insulator according to Embodiment 1 viewed from the front side.
Figure 7:
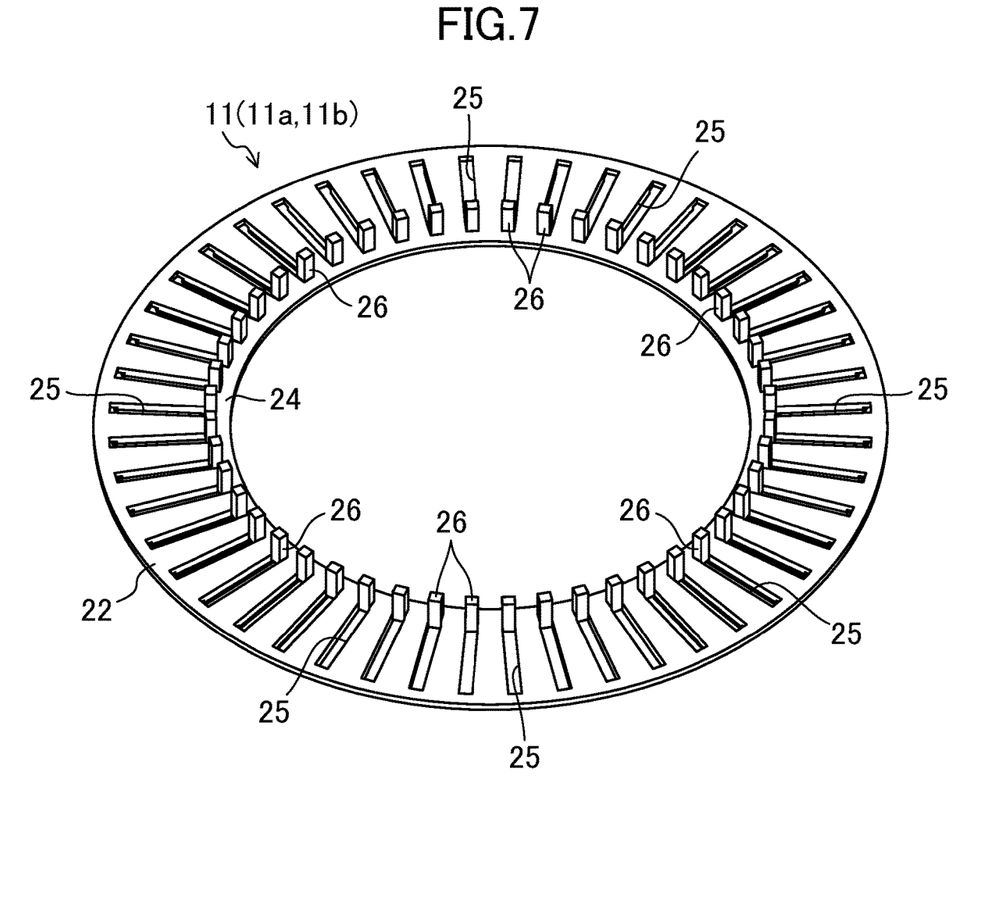
FIG. 7 is a perspective view of the insulator according to Embodiment 1 viewed from the rear side.

As illustrated in FIG. 6 and FIG. 7, each insulator (11) is a resin stator component that is an annular integral molded object. The insulator (11) is made of, for example, liquid crystal polymer (LCP), polybutylene terephthalate (PBT), or the like. The insulator (11) includes an outer ring portion (22), a plurality of winding barrel portions (23), and an inner ring portion (24). The outer ring portion (22), the plurality of winding barrel portions (23), and the inner ring portion (24) are integrally molded.

The outer ring portion (22) is an annular part that has a diameter larger than the diameter of the inner ring portion (24) and that constitutes the outer peripheral portion of the insulator (11). The inner ring portion (24) is an annular part that has a diameter smaller than the diameter of the outer ring portion (22) and that constitutes the inner peripheral portion of the insulator (11). The plurality of winding barrel portions (23) are radially disposed to be spaced from each other in the circumferential direction of the insulator (11) and couple the outer ring portion (22) and the inner ring portion (24) in the radial direction.

The number of the provided winding barrel portions (23) corresponds to the number of the teeth (13) of the stator core (9). In the examples illustrated in FIG. 6 and FIG. 7, 48 winding barrel portions (23) are provided. The winding barrel portions (23) each have a shape that bulges on the surface side of the insulator (11) with respect to the outer ring portion (22) and the inner ring portion (24). The width of each of the winding barrel portions (23) in the circumferential direction is substantially identical to the width of each of the teeth (13) of the stator core (9) in the circumferential direction.

The width of each of the winding barrel portions (23) in the circumferential direction increases toward the outer peripheral side in accordance with the shape of each of the teeth (13). End portions of the winding barrel portions (23) positioned on the surface side of the insulator (11) at both sides in the circumferential direction each have a curved shape rounded to have no corners. In the first insulator (11a), the parts of the winding barrel portions (23) having the curved shape are parts that are in contact with or close to the crossover wire portions (21) of the segment conductors (18).

In the second insulator (11b), the parts of the winding barrel portions (23) having the curved shape are parts that are in contact with or close to the leg portions (20) of the segment conductors (18).

In the insulator (11), insertion holes (25) into which the segment conductors (18) are inserted are open between the winding barrel portions (23) adjacent to each other. The number of the provided insertion holes (25) corresponds to the number of the winding slots (15) of the stator core (9). In the examples illustrated in FIG. 6 and FIG. 7, 48 insertion holes (25) are provided. The width of each of the insertion holes (25) in the circumferential direction is substantially identical to the width of each of the winding slots (15) of the stator core (9) in the circumferential direction.

At the inner ring portion (24), a plurality of insertion portions (26) are integrally provided. Each of the plurality of insertion portions (26) is a part that projects from the inner ring portion (24) to the rear side of the insulator (11). In the inner ring portion (24), the insertion portions (26) are positioned, between the winding barrel portions (23) adjacent to each other, on the inner peripheral side of the insertion holes (25).

The first insulator (11a) is disposed with respect to the stator core (9) on the side where the segment conductors (18) are inserted. The first insulator (11a) is positioned on the same side as the crossover wire portions (21) of the segment conductors (18). The winding barrel portions (23) of the first insulator (11a) are disposed between the teeth (13) of the stator core (9) and the crossover wire portions (21) of the segment conductors (18).

The insertion holes (25) of the first insulator (11a) are disposed at portions corresponding to the winding slots (15) of the stator core (9). The inner ring portion (24) of the first insulator (11a) is disposed along the flange portions (14) that are at the tip portions of the teeth (13) of the stator core (9). The insertion portions (26) of the first insulator (11a) are inserted into the winding slots (15) from open ends in the axial direction.

The second insulator (11b) is disposed with respect to the stator core (9) on the side where the leg portions (20) of the different segment conductors (18) are joined to each other. The second insulator (11b) is positioned on the same side as end portions of the segment conductors (18). The winding barrel portions (23) of the second insulator (11b) are disposed between the teeth (13) of the stator core (9) and bent parts on the side of joined portions of the segment conductors (18).

The insertion holes (25) of the second insulator (11b) are disposed at portions corresponding to the winding slots (15) of the stator core (9). The inner ring portion (24) of the second insulator (11b) are disposed along the flange portions (14) that are at the tip portions of the teeth (13) of the stator core (9). The insertion portions (26) of the second insulator (11b) are inserted into the winding slots (15) from open ends in the axial direction.

As illustrated in FIG. 3, the insertion portions (26) of the first insulator (11a) and the insertion portions (26) of the second insulator (11b) are each disposed on the inner peripheral side from the leg portion (20) positioned on the innermost peripheral side in a group of the leg portions (20) of the segment conductors (18) accommodated in the winding slots (15). In other words, these insertion portions (26) are interposed between the group of the leg portions (20) of the segment conductors (18) and the flange portions (14) of the stator core (9) inside the winding slots (15).

The insertion portions (26) of the first insulator (11a) and the insertion portions (26) of the second insulator (11b) partly close the openings (16) between the flange portions (14) adjacent to each other (refer to FIG. 4 and FIG. 5). The stator windings (10) are fixed at predetermined positions to be displaced toward the outer peripheral side of the winding slots (15) by the insertion portions (26) of the first insulator (11a) and the insertion portions (26) of the second insulator (11b).

The insertion portions (26) of the first insulator (11a) and the insertion portions (26) of the second insulator (11b) are each wound inside the insulating sheets (17) together with the group of the leg portions (20) of the segment conductors (18) accommodated in the winding slots (15). The insulating sheets (17) are held between the insertion portions (26) of the insulator (11) and the inner peripheral surfaces of the winding slots (15).

The insertion portions (26) of the first insulator (11a) and the insertion portions (26) of the second insulator (11b) play a role that eliminates the wobble of the segment conductors (18) inside the winding slots (15) to cause the segment conductors (18) not to move toward the inner peripheral side inside the winding slots (15) and thereby suppresses movement of the segment conductors (18). These insertion portions (26) also have a function of, for example, suppressing magnetic imbalance of the teeth (13).

In the production of the stator (3), the first insulator (11a) and the second insulator (11b) are set at both end surfaces of the stator core (9) in the axial direction before the stator windings (10) are provided at the stator core (9). Thereafter, the plurality of segment conductors (18) are inserted via the first insulator (11a) and the second insulator (11b) into the winding slots (15) of the stator core (9) into which the insulating sheets (17) are previously inserted. At this time, the crossover wire portions (21) of the segment conductors (18) are easily bent. Therefore, the end portions of the segment conductors (18) projecting from a side opposite to the insertion side of the winding slots (15) are pulled, and the segment conductors (18) are set with respect to the stator core (9). Then, the end portions of the predetermined segment conductors (18) projecting from the winding slots (15) are twisted together and welded. The segment conductors (18) are bent when the end portions thereof are twisted together with the end portions of the other segment conductors (18).

The first insulator (11a) functions as a positioning member that determines a positional relationship of the segment conductors (18) in the axial direction relative to the stator core (9) by receiving the side of the crossover wire portions (21) of the segment conductors (18) at the winding barrel portions (23) when the segment conductors (18) are set at the stator core (9). The first insulator (11a) contributes to a reduction of the wobble of the stator windings (10).

The second insulator (11b) functions as a spacer that is interposed between the joined portions at which the segment conductors (18) are joined to each other and the stator core (9) by receiving the bent leg portions (20) of the segment conductors (18) at the winding barrel portions (23) when the end portions of the segment conductors (18) are twisted together. As with the first insulator (11a), the second insulator (11b) contributes to a reduction of the wobble of the stator windings (10).

Effects of Embodiment 1

The stator (3) according to Embodiment 1 includes the first insulator (11a) and the second insulator (11b) that are disposed at both end surfaces of the stator core (9) in the axial direction. Each of the first insulator (11a) and the second insulator (11b) is a resin member and includes a plurality of the winding barrel portions (23) and a plurality of the insertion portions (26) that are integrally molded.

The winding barrel portions (23) of the first insulator (11a) are disposed between the stator core (9) and the crossover wire portions (21) of the segment conductors (18) and receive the side of the crossover wire portions (21) of the segment conductors (18). Consequently, when the end portions of the segment conductors (18) projecting from the winding slots (15) are pulled to set the segment conductors (18) at the stator core (9) in the production of the stator (3), it is possible to prevent the segment conductors (18) from being damaged by interfering with the edges of the open ends of the winding slots (15) of the stator core (9). It is thereby possible to improve the quality of the stator windings (10).

The winding barrel portions (23) of the first insulator (11a) function as positioning members that determine a positional relationship of the segment conductors (18) in the axial direction relative to the stator core (9). It is thus possible to improve precision of positioning in the insertion direction of the segment conductors (18) relative to the stator core (9). Consequently, it is possible to ensure an insulation distance between the end surface of the stator core (9) and the stator windings (10) suitably on the side where the first insulator (11a) is disposed. In addition, it is possible to cause the allowance of projection of the segment conductors (18) from the winding slots (15) to be stable.

As a method of causing the allowance of projection of the segment conductors (18) from the winding slots (15) to be stable, it may be considered, when not using the first insulator (11a), to provide the leg portions (20) of the segment conductors (18) with an adjustment allowance and remove excess portions of the leg portions (20) projecting from the winding slots (15) to thereby adjust the allowance of projection. However, since the length of each segment conductor (18) is increased, costs of the stator windings (10) may be increased. The stator (3) according to Embodiment 1 does not require adjustment of the allowance of projection of the segment conductors (18) from the winding slots (15) and thus can improve workability in welding the segment conductors (18) to each other. It is also possible to improve the quality (welding quality) of joining between the segment conductors (18).

In addition, it is possible by improving precision of positioning in the insertion direction of the segment conductors (18) relative to the stator core (9) to design the segment conductors (18) to have a short length. Consequently, it is possible to reduce a copper loss in each segment conductor (18) and improve efficiency in generation of the rotating magnetic field by the stator windings (10). In addition, since the end portions of the stator windings (10) projecting in the axial direction from the stator core (9) can be shortened, it is possible to reduce a clearance between the motor (1) that includes the stator (3) and a casing that accommodates the motor (1), which contributes to a reduction in product size.

The winding barrel portions (23) of the second insulator (11b) are disposed between the joined portions at which the segment conductors (18) are joined to each other and the stator core (9) and receive the bent leg portions (20) of the segment conductors (18) at the winding barrel portions (23). Consequently, it is possible to prevent the segment conductors (18) from being damaged by interfering with the end surface of the stator core (9) at the time of bending when the end portions of the segment conductors (18) are joined to each other in the production of the stator (3). It is thereby possible to improve the quality of the stator windings (10).

The winding barrel portions (23) of the second insulator (11b) function as spacers that are interposed between the joined portions at which the segment conductors (18) are joined to each other and the stator core (9). It is thus possible to ensure an insulation distance between the end surface of the stator core (9) and the stator windings (10) suitably on the side where the second insulator (11b) is disposed.

The insertion portions (26) of the first insulator (11a) and the insertion portions (26) of the second insulator (11b) are each disposed on the inner peripheral side from the leg portion (20) of the segment conductors (18) positioned on the innermost peripheral side inside the winding slots (15). It is thereby possible to suppress movement of the segment conductors (18) inside the winding slots (15) by the insertion portions (26) of both of the first insulator (11a) and the second insulator (11b). Consequently, in the stator (3), the stator windings (10) are fixed at predetermined positions inside the winding slots (15) and thus are prevented from bulging out through the openings (16) provided on the inner peripheral side of the winding slots (15).

In addition, due to the stator windings (10) being fixed to be displaced toward the outer peripheral side of the winding slots (15), an insulation distance between the stator windings (10) and the rotor (2) is ensured by the insertion portions (26) of the first insulator (11a), the insertion portions (26) of the second insulator (11b), and the insulating sheets (17). It is also possible to reduce eddy current that is generated by interlinkage of a high-frequency magnetic flux generated between the teeth (13) with the stator windings (10). Consequently, it is possible to prevent abnormal heat generation of the stator windings (10) caused by eddy current.

Interlinkage of a leakage flux from the tips of the teeth (13) with the stator windings (10) causes an event in which current density of each stator winding (10) varies depending on a difference in an induced electromotive voltage. As the amount of interlinkage of the leakage flux with the stator windings (10) increases, the loss in the motor (1) increases. In contrast, in the stator (3) according to Embodiment 1, due to the stator windings (10) being fixed to be displaced toward the outer peripheral side of the winding slots (15), the amount of interlinkage of a leakage flux from the tips of the teeth (13) with the stator windings (10) is decreased. It is thus possible to reduce the loss in the motor (1).

The plurality of insertion portions (26) of the first insulator (11a) have a positional relationship, as a whole, surrounding the group of the flange portions (14) on the outer peripheral side relative to the stator core (9). Consequently, when the first insulator (11a) is mounted to the stator core (9), the first insulator (11a) can be fixed to the stator core (9), which is an advantage for improvement of workability in providing the stator windings (10) at the stator core (9). Regarding the above, the same effect can be obtained with the second insulator (11b).

Meanwhile, there is a known structure in which rod-like resin components called wedges are each inserted, into a respective one of a plurality of winding slots (15), between the leg portion (20) that is on the innermost peripheral side in the group of the leg portions (20) of the segment conductors (18) and the flange portions (14) to thereby cause the resin components to have the functions of the insertion portions (26) of the first insulator (11a) and the second insulator (11b).

However, in such a structure, a wedge is necessary for each winding slot (15), which increases the number of components of the stator (3). Moreover, in the production of the stator (3), it is necessary to insert a wedge into a gap of each winding slot (15) after the provision of the stator windings (10) (segment conductors (18)), which degrades workability.

In contrast, with the first insulator (11a) and the second insulator (11b), the insertion portions (26) play the role of the aforementioned wedges, and it is thus possible to omit the wedges and reduce the number of components of the stator (3). The first insulator (11a) and the second insulator (11b) are annular integral moldings and thus can be easily mounted to the stator core (9) in the production of the stator (3). Work of inserting the aforementioned wedges into the winding slots (15) can be eliminated by only mounting the first insulator (11a) and the second insulator (11b) to the stator core (9), and thus, workability in the production of the stator (3) can be improved.

Inside each winding slot (15), the insulating sheets (17) are held between the insertion portions (26) of the first insulator (11a) and the insertion portions (26) of the second insulator (11b), and the inner peripheral surfaces of the winding slots (15). It is thus possible to fix the insulating sheets (17) inside the winding slots (15) with respect to the stator core (9). Consequently, it is enabled to insert the segment conductors (18) in a state in which the insulating sheets (17) are fixed with respect to the winding slots (15). Thus, workability in providing the stator windings (10) at the stator core (9) is excellent, and it is possible to produce the stator (3) stably.

The segment conductors (18) are covered by the resin insulating films (19). Consequently, insulation can be ensured around the segment conductors (18), and the segment conductors (18) that constitute the stator windings (10) of different phases can be disposed at the same winding slot (15).

In the winding barrel portions (23) of the first insulator (11a), parts that are in contact with or close to the crossover wire portions (21) of the segment conductors (18) each have a curved shape. Consequently, it is possible to prevent the segment conductors (18) from being damaged, even when the segment conductors (18) interfere with the winding barrel portions (23) of the first insulator (11a) when the end portions of the segment conductors (18) projecting from the winding slots (15) are pulled to set the segment conductors (18) at the stator core (9).

In the winding barrel portions (23) of the second insulator (11b), parts that are in contact with or close to the leg portions (20) of the segment conductors (18) each have a curved shape. Consequently, it is possible to prevent the segment conductors (18) from being damaged by interfering with the winding barrel portions (23) of the second insulator (11b) in bending at the time of joining the end portions of the segment conductors (18) to each other in the production of the stator (3).

Embodiment 2

Embodiment 2 will be described.

The motor (1) according to Embodiment 2 is the motor (1) according to Embodiment 1 in which the shapes of the first insulator (11a) and the second insulator (11b) of the stator (3) are changed. Here, regarding the stator (3) included in the motor (1) according to Embodiment 2, features that differ from those of the stator (3) according to Embodiment 1 will be described.

Figure 8:
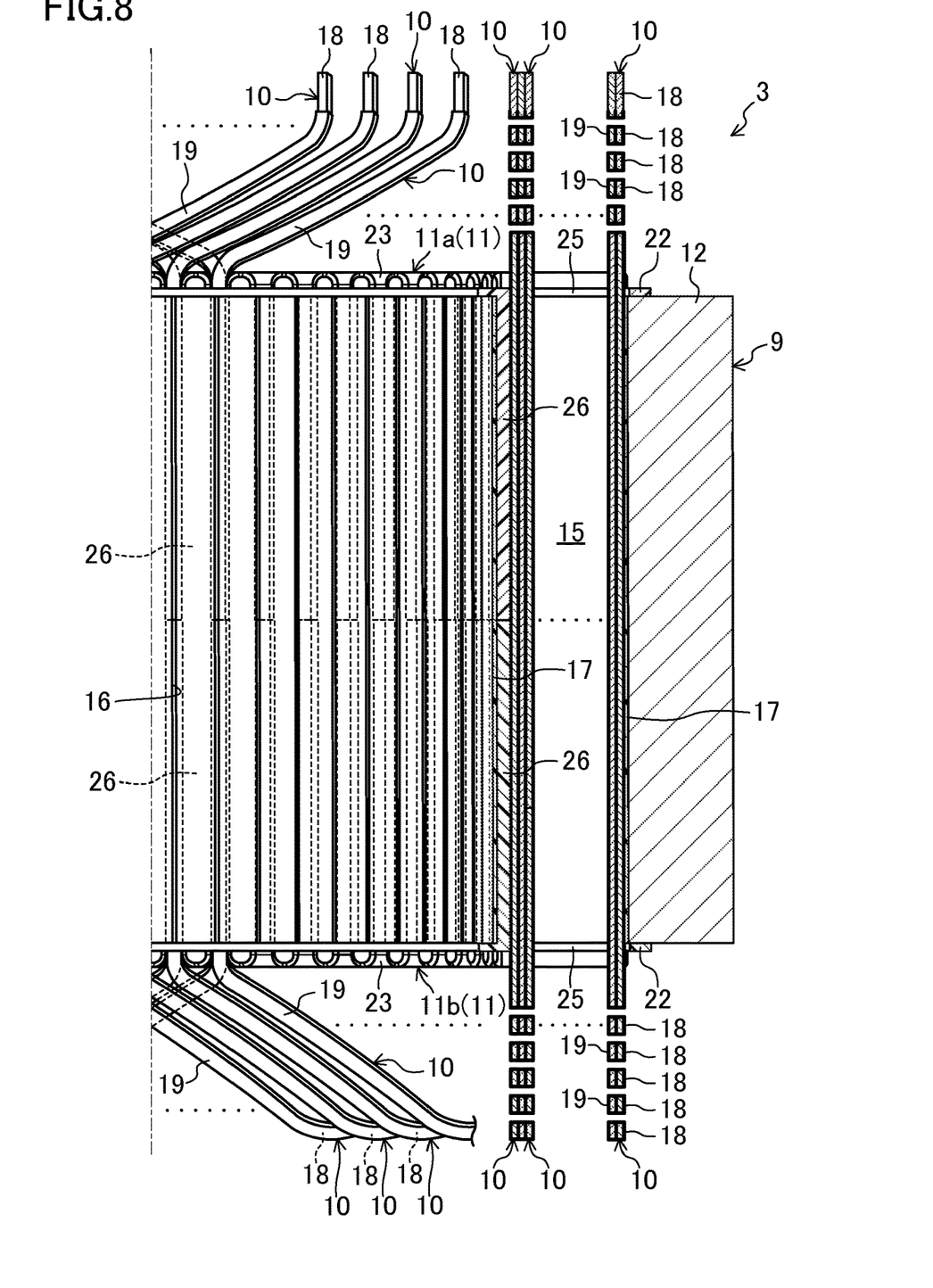
FIG. 8 is a longitudinal sectional view of a stator according to Embodiment 2.

As illustrated in FIG. 8, the insertion portions (26) of the first insulator (11a) each have a length that is substantially half the length of each winding slot (15) of the stator core (9) in the axial direction. The insertion portions (26) of the second insulator (11b) also each have a length that is substantially half the length of each winding slot (15) of the stator core (9) in the axial direction.

The insertion portions (26) of the first insulator (11a) and the insertion portions (26) of the second insulator (11b) abut each other in the axial direction at an intermediate position in the length direction of the winding slots (15). The shape of a surface at which the insertion portions (26) of the first insulator (11a) and the insertion portions (26) of the second insulator (11b) abut each other can be various shapes including an inclined surface that is inclined with respect to the axial direction and the radial direction, and the like in addition to a flat surface, such as that illustrated in FIG. 8, orthogonal to the axial direction.

Effects of Embodiment 2

In the stator (3) according to Embodiment 2, the leg portion (20) of the segment conductors (18) positioned on the innermost peripheral side inside the winding slots (15) is covered, on the inner peripheral side of the stator core (9), by the insertion portions (26) of the first insulator (11a) and the insertion portions (26) of the second insulator (11b) at the entirety thereof in the length direction of the winding slots (15). Consequently, even when the leg portions (20) of the segment conductors (18) each attempt to deform to be bent at an intermediate portion thereof, the deformation of the leg portions (20) is restricted, and the movement of the segment conductors (18) inside the winding slots (15) can be suitably prevented.

Other Embodiments

Embodiment 1 and Embodiment 2 described above may have the following configurations.

Figure 9:
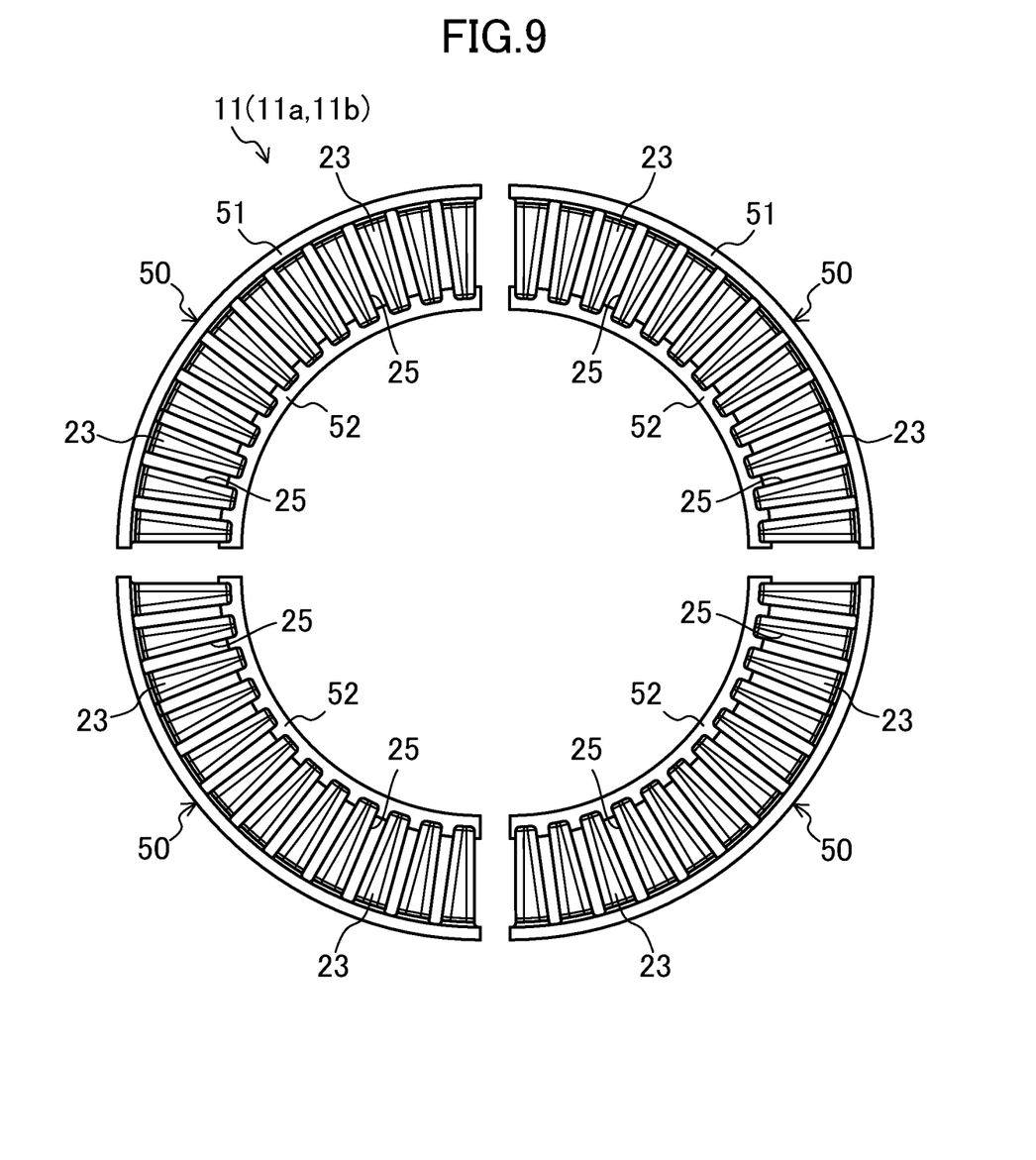
FIG. 9 is a plan view of an insulator according to a modification.

As illustrated in FIG. 9, the insulator (11) that is used as the first insulator (11a) and the second insulator (11b) may include a plurality of arc-shaped divided bodies (50). The plurality of divided bodies (50) each include an outer ring piece (51) that constitutes the outer ring portion (22), an inner ring piece (52) that constitutes the inner ring portion (24), the winding barrel portions (23), and the insertion portions (26).

The plurality of divided bodies (50) are assembled to each other and thereby constitute an annular shape as a whole. The divided bodies (50) that are adjacent to each other may be coupled by a fitting structure. In the example illustrated in FIG. 9, a type in which the annular insulator (11) is divided into four are illustrated. However, the number of division of the insulator (11) may be two. Any number of division can be employed.

With the insulator (11) of such a division type, a cumulative tolerance (stacking tolerance) of each divided body (50) can be suppressed compared with the cumulative tolerance of the insulator (11) that is constituted by an annular integral molding. Therefore, it is possible to enable the insulator (11) to be easily mounted to the stator core (9).

In the stator (3) according to Embodiment 2, the insertion portions (26) of the first insulator (11a) and the insertion portions (26) of the second insulator (11b) may be fitted to each other at respective tip parts that abut each other. The insertion portions (26) of the first insulator (11a) and the insertion portions (26) of the second insulator (11b) may have lengths to face each other at an intermediate portion in the axial direction of the winding slots (15) with a gap therebetween. The length of each of the insertion portions (26) may be set to any length.

The segment conductors (18) that constitute the stator windings (10) may not be provided with the insulating films (19). In this case, the above effect in which an insulation distance between an end surface of the stator core (9) and the stator windings (10) can be ensured by the first insulator (11a) and the second insulator (11b) is particularly effective.

In the stator (3), the insulator (11) provided at the stator core (9) may be only the first insulator (11a).

In the stator (3), the winding slots (15) of the stator core (9) may have an open structure in which the teeth (13) are not provided with the flange portions (14) and may have a closed structure in which the openings (16) are not formed on the inner peripheral side of the stator core (9).

Although embodiments and modifications have been described above, it should be understood that various changes in the forms and the details are possible without departing from the gist and the scope of the claims. The above embodiments and modifications may be combined and replaced, as appropriate, as long as the object functions of the present disclosure are not lost.

As described above, the present disclosure is useful for a stator.

The invention claimed is:

1. A stator comprising:
a cylindrical stator core provided with a plurality of slots;
a segment conductor mounted to the stator core, the segment conductor including
a plurality of leg portions inserted into the slots, and
a crossover wire portion that couples two of the leg portions inserted into the slots that differ from each other; and
a resin insulator including a winding barrel portion and an insertion portion that are integrally molded, the winding barrel portion being disposed between the stator core and the crossover wire portion of the segment conductor, and the insertion portion being disposed on an inner side from the segment conductor inside the slots of the stator core,
the winding barrel portion including a plurality of winding barrel portions,
in the insulator, an insertion hole into which the segment conductor is inserted being open between the winding barrel portions adjacent to each other, and
the insertion portion being provided in the insulator at only a radially inner portion of the insertion hole.

2. The stator according to claim 1, wherein
in the slots, an insulating sheet is provided between inner peripheral surfaces of the slots and the leg portions of the segment conductor inserted into the slots, and
the insulating sheet is held between the insertion portion of the insulator and the inner peripheral surfaces of the slots.

3. The stator according to claim 2, wherein
the segment conductor is covered by a resin insulating film.

4. The stator according to claim 2, wherein
of the winding barrel portion of the insulator, a portion that is in contact with or adjacent to the crossover wire portion of the segment conductor has a curved shape.

5. The stator according to claim 2, wherein
the insulator is a first insulator disposed at an end surface on one side in an axial direction along a center line of the stator core, and
a second insulator, which has a configuration identical to a configuration of the first insulator, is disposed at an end surface on an other side in the axial direction of the stator core.

6. The stator according to claim 2, wherein
the insulator is an annular integral molding.

7. The stator according to claim 2, wherein
the insulator includes a plurality of arc-shaped divided bodies that each include the winding barrel portion and the insertion portion, and the insulator has an annular shape formed by the plurality of divided bodies combined together.

8. The stator according to claim 1, wherein
the segment conductor is covered by a resin insulating film.

9. The stator according to claim 8, wherein
of the winding barrel portion of the insulator, a portion that is in contact with or adjacent to the crossover wire portion of the segment conductor has a curved shape.

10. The stator according to claim 8, wherein
the insulator is a first insulator disposed at an end surface on one side in an axial direction along a center line of the stator core, and
a second insulator, which has a configuration identical to a configuration of the first insulator, is disposed at an end surface on an other side in the axial direction of the stator core.

11. The stator according to claim 8, wherein
the insulator is an annular integral molding.

12. The stator according to claim 8, wherein
the insulator includes a plurality of arc-shaped divided bodies that each include the winding barrel portion and the insertion portion, and the insulator has an annular shape formed by the plurality of divided bodies combined together.

13. The stator according to claim 1, wherein
of the winding barrel portion of the insulator, a portion that is in contact with or adjacent to the crossover wire portion of the segment conductor has a curved shape.

14. The stator according to claim 13, wherein
the insulator is a first insulator disposed at an end surface on one side in an axial direction along a center line of the stator core, and
a second insulator, which has a configuration identical to a configuration of the first insulator, is disposed at an end surface on an other side in the axial direction of the stator core.

15. The stator according to claim 13, wherein
the insulator is an annular integral molding.

16. The stator according to claim 13, wherein
the insulator includes a plurality of arc-shaped divided bodies that each include the winding barrel portion and the insertion portion, and the insulator has an annular shape formed by the plurality of divided bodies combined together.

17. The stator according to claim 1, wherein
the insulator is a first insulator disposed at an end surface on one side in an axial direction along a center line of the stator core, and
a second insulator, which has a configuration identical to a configuration of the first insulator, is disposed at an end surface on an other side in the axial direction of the stator core.

18. The stator according to claim 17, wherein
the insertion portion of the first insulator and an insertion portion of the second insulator abut each other in the axial direction of the stator core.

19. The stator according to claim 1, wherein
the insulator is an annular integral molding.

20. The stator according to claim 1, wherein
the insulator includes a plurality of arc-shaped divided bodies that each include the winding barrel portion and the insertion portion, and the insulator has an annular shape formed by the plurality of divided bodies combined together.

* * * * *